United States Patent
Stewart (10) Patent No.: US 7,322,238 B2
(45) Date of Patent: *Jan. 29, 2008

(54) SUPPORT OF VIBRATING BEAM NEAR NODAL POINT

(75) Inventor: Robert E. Stewart, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/057,291

(22) Filed: Feb. 11, 2005

(65) Prior Publication Data

US 2005/0193815 A1    Sep. 8, 2005

Related U.S. Application Data

(60) Provisional application No. 60/549,710, filed on Mar. 3, 2004, provisional application No. 60/549,709, filed on Mar. 3, 2004.

(51) Int. Cl.
*G01P 9/04* (2006.01)

(52) U.S. Cl. .................... 73/504.14; 73/504.12

(58) Field of Classification Search ............. 73/504.12, 73/504.14
See application file for complete search history.

(56) References Cited

U.S. PATENT DOCUMENTS

| 4,267,731 A | | 5/1981 | Jacobson | |
| 4,836,023 A | | 6/1989 | Oikawa | |
| 5,635,647 A | * | 6/1997 | Heinouchi | 73/504.14 |
| 6,035,713 A | * | 3/2000 | Mori et al. | 73/504.14 |
| 7,174,785 B2 | * | 2/2007 | Stewart | 73/504.12 |

FOREIGN PATENT DOCUMENTS

| EP | 0 682 407 A1 | 11/1995 |
| EP | 0 751 374 A2 | 1/1997 |
| EP | 0 823 616 A2 | 2/1998 |
| GB | 2 208 318 A | 3/1989 |

* cited by examiner

*Primary Examiner*—John E. Chapman
(74) *Attorney, Agent, or Firm*—Carmen B. Patti & Assoc., LLC (57) ABSTRACT

An apparatus in one example comprises a vibrating beam that comprises a nodal point for oscillation in any one or more of a plurality of substantially perpendicular directions for driving into oscillation and sensing angular rate of the vibrating beam. The vibrating beam comprises an aperture that allows a frame to support the vibrating beam near the nodal point.

28 Claims, 6 Drawing Sheets

SUPPORT OF VIBRATING BEAM NEAR NODAL POINT

CROSS-REFERENCE TO RELATED APPLICATIONS

This application claims the priority of U.S. provisional Patent Application Ser. No. 60/549,710 (by Robert E. Stewart, filed Mar. 3, 2004, and entitled "SUPPORT OF VIBRATING BEAM NEAR NODAL POINT").

This application contains subject matter that is related to the subject matter of the following applications, which are assigned to the same assignee as this application. The below-listed applications are hereby incorporated herein by reference in their entireties.

U.S. provisional Patent Application Ser. No. 60/549,709 (by Robert E. Stewart, filed Mar. 3, 2004, and entitled "OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM").

U.S. patent application Ser. No. 11/057,324, entitled "OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM," by Robert E. Stewart, filed Feb. 11, 2005.

TECHNICAL FIELD

The invention relates generally to electromechanical systems and more particularly to supporting vibrating beams in electromechanical systems.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures angular rate (e.g., rotation). The gyroscope in one example comprises a vibrating beam with high Q degenerate fundamental modes of oscillation. For example, high Q vibrating beams require little energy to sustain oscillation. The vibrating beam in one example is employable for high performance closed loop angular rate sensing. The gyroscope in another example is employable for lower performance open loop angular rate sensing. The mathematical model of the symmetrical vibrating beam is in many aspects similar to a vibrating ring or hemispherical. resonator gyroscope ("HRG"). The analytical similarity to the hemispherical resonator gyroscope indicates that the vibrating beam gyroscope has the potential of achieving similar performance.

The gyroscope comprises drive components coupled with the vibrating beam to cause a first oscillation of the vibrating beam. An angular rate of the vibrating beam and the first oscillation induce a Coriolis force on the vibrating beam. For example, the angular rate is about the longitudinal axis of the vibrating beam. The Coriolis force causes a second oscillation of the vibrating beam. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating beam.

The vibrating beam in one example is supported by a frame. The frame connects with an outer surface of the vibrating beam. The frame allows movement of the vibrating beam upon occurrence of an angular rate. As one shortcoming, the frame absorbs a portion of the oscillation energy of the vibrating beam. The transfer of the oscillation energy from the vibrating beam to the frame reduces the oscillation energy of the vibrating beam. For example, the frame restricts motion of the vibrating beam and reduces the Q of the vibrating beam.

As another shortcoming, the gyroscope is sensitive to changes in the mechanical impedance of the structure to which the vibrating beam is mounted. This effect, known as mounting sensitivity, can result in gyroscope bias drift errors. The bias drift errors in one example result from changes in the mechanical impedance of the gyroscope housing and the structure to which it is mounted. Changes in mechanical impedance can be caused by changes in temperature giving rise to potentially large gyro bias drift temperature sensitivity.

Thus, a need exists for an angular rate sensing gyroscope that promotes a reduction in an amount of oscillation energy transferred from a vibrating beam to support components. A further need exists for an angular rate sensing gyroscope that promotes a reduction in sensitivity to changes in mechanical impedance of the vibrating beam mounting structure.

SUMMARY

The invention in one embodiment encompasses an apparatus. The apparatus comprises a vibrating beam that comprises a nodal point for oscillation in any one or more of a plurality of substantially perpendicular directions for driving into oscillation and sensing angular rate of the vibrating beam. The vibrating beam comprises an aperture that allows a frame to support the vibrating beam near the nodal point.

The invention in another embodiment encompasses a gyroscope. The gyroscope comprises: a vibrating beam; a drive component that causes a first oscillation in the vibrating beam; a pickoff component that senses a second oscillation induced in the vibrating beam by a Coriolis force on the vibrating beam; and a frame. The vibrating beam comprises a nodal point for both the first and second oscillations. The nodal point is internal to the vibrating beam. The vibrating beam comprises an aperture that exposes a flexure component at the nodal point. The frame connects with the flexure component to support the vibrating beam near the nodal point within the vibrating beam.

The invention in yet another embodiment encompasses a method. An aperture is etched into a vibrating beam of an angular rate sensing gyroscope to form a flexure component at a nodal point within the vibrating beam. The nodal point comprises an intersection location of a first nodal axis of a first oscillation in the vibrating beam and a second nodal axis of a second oscillation in the vibrating beam. A frame is connected with the flexure component to support the vibrating beam near the nodal point to promote a reduction in an amount of oscillation energy that transfers from the vibrating beam into the frame.

DESCRIPTION OF THE DRAWINGS

Features of exemplary implementations of the invention will become apparent from the description, the claims, and the accompanying drawings in which:

DETAILED DESCRIPTION

Figure 1:
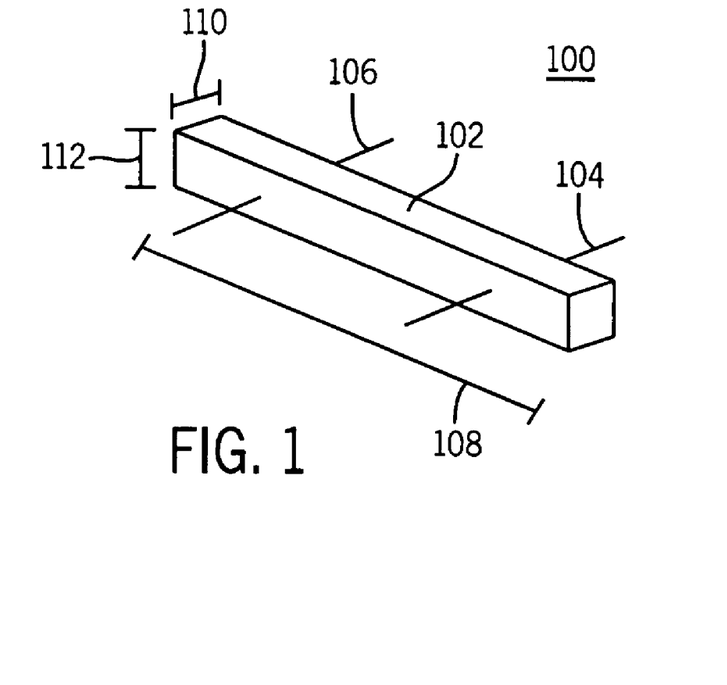
FIG. 1 is a representation of an exemplary implementation of an apparatus that comprises a vibrating beam and illustrates the nodal axes for vertical oscillation.

Turning to FIG. 1, an apparatus 100 in one example comprises a vibrating beam 102 employable by a microelectromechanical system ("MEMS") measurement component. For example, a gyroscope may employ the vibrating beam 102 for high accuracy navigation angular rate sensing.

The vibrating beam 102 in one example comprises a rectangular, triangular, or circular prism. For example, the rectangular prism comprises a length dimension 108 that is greater than a width dimension 110 and a height dimension 112. In another example, the vibrating beam 102 comprises a cross-section that is a hexagon or an octagon. The vibrating beam 102 in one example is constructed from a material with low internal loss to achieve high Q. For example, high Q vibrating beams require little energy to sustain oscillation. The drive and sense methods for the vibrating beam 102 are chosen to excite and read out the motion of the vibrating beam 102 while retaining the high Q. In one example, the vibrating beam 102 comprises an integral silicon beam. In another example, the vibrating beam 102 comprises a plurality of silicon layers, such as three silicon layers bonded together. In yet another example, the vibrating beam 102 comprises an integral crystalline quartz beam. In still yet another example, the vibrating beam 102 comprises a permeable material.

Figure 2:
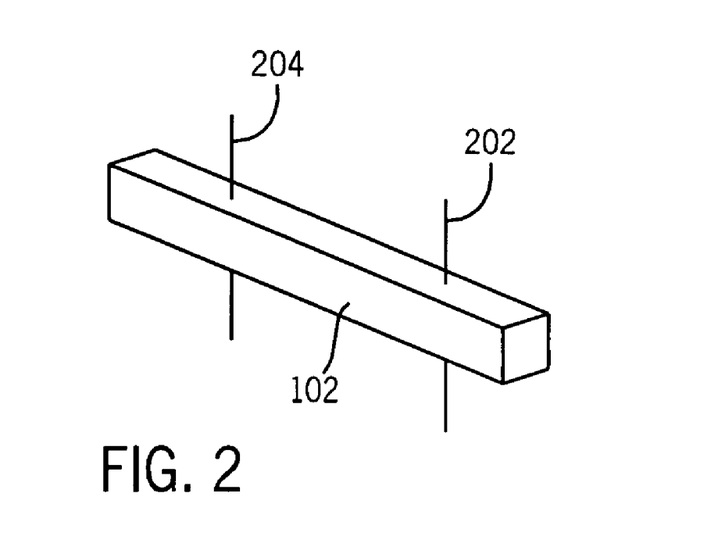
FIG. 2 is a representation of the vibrating beam of the apparatus of FIG. 1 and illustrates the nodal axes for horizontal oscillation.

Referring to FIGS. 1-2, the vibrating beam 102 comprises one or more nodal axes 104 and 106 for vertical oscillation (e.g., vertical vibration). For example, vertical oscillation of the vibrating beam 102 may occur with counter rotation about the nodal axes 104 and 106. The nodal axes 104 and 106 stay substantially still during oscillation. The vibrating beam 102 is substantially symmetric for oscillation about the nodal axes 104 and 106. The vibrating beam 102 also comprises one or more nodal axes 202 and 204 for horizontal oscillation (e.g., horizontal vibration). For example, horizontal oscillation of the vibrating beam 102 may occur with counter rotation about the nodal axes 202 and 204. The nodal axes 202 and 204 stay substantially still during oscillation. The vibrating beam 102 is substantially symmetric for oscillation about the nodal axes 202 and 204. The nodal axis 104 for vertical oscillation and the nodal axis 202 for horizontal oscillation in one example intersect at a first nodal point. Also, the nodal axis 106 for vertical oscillation and the nodal axis 204 for horizontal oscillation in one example intersect at a second nodal point.

The vibrating beam 102 comprises a first plane that equally bisects the width 110 of the vibrating beam 102. The vibrating beam 102 comprises a second plane that equally bisects the height 112 of the vibrating beam 102. The first and second nodal points are within an interior of the vibrating beam 102. For example, the first nodal point in one example is located at an intersection point of the nodal axis 104, the nodal axis 202, the first plane, and the second plane. The second nodal point in one example is located at an intersection point of the nodal axis 106, the nodal axis 204, the first plane, and the second plane.

Figure 3:
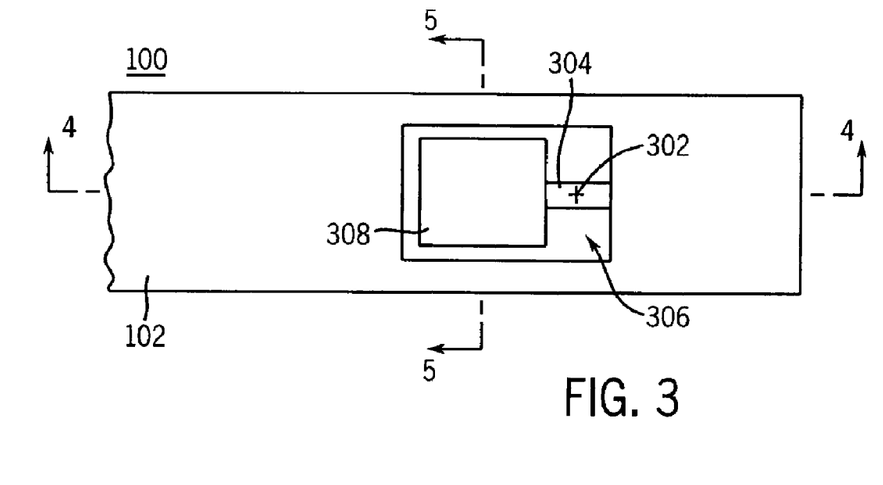
FIG. 3 is one representation of an aperture near a nodal point of the vibrating beam of the apparatus of FIG. 1 where a nodal axis for vertical oscillation and a nodal axis for horizontal oscillation intersect.
Figure 4:
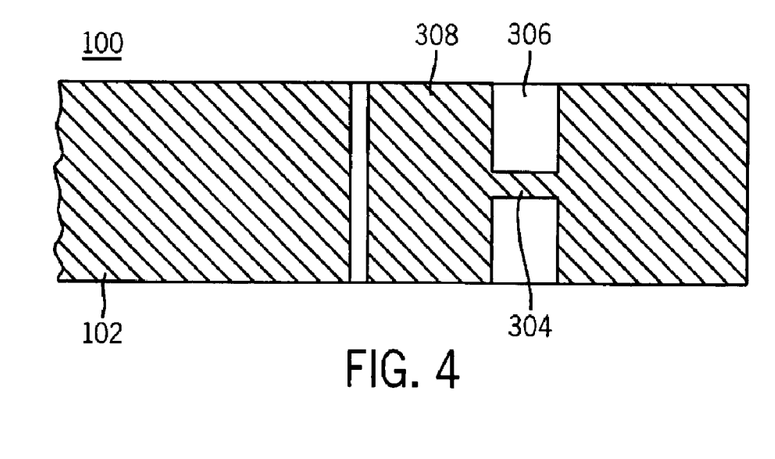
FIG. 4 is a sectional representation of the vibrating beam directed along line 4-4 of FIG. 3.
Figure 5:
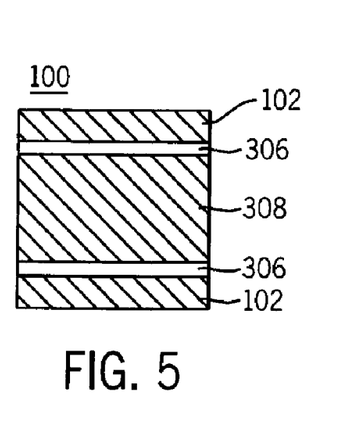
FIG. 5 is a sectional representation of the vibrating beam directed along line 5-5 of FIG. 3.

Referring to FIGS. 3-5, the vibrating beam 102 in one example comprises a nodal point 302 (e.g., the first or second nodal point) where the nodal axis 106 (FIG. 1) for vertical oscillation and the nodal axis 204 (FIG. 2) for horizontal oscillation intersect. The nodal point 302 is for oscillation in any one or more of a plurality of substantially perpendicular directions. For example, the nodal point 302 remains substantially still during both vertical oscillation about the nodal axis 106 (FIG. 1) and horizontal oscillation about the nodal axis 204 (FIG. 2).

The vibrating beam 102 in one example is supported by a flexure component 304 connected with a frame. The flexure component 304 allows movement of the vibrating beam 102 upon occurrence of an angular rate. For example, the angular rate is about the longitudinal axis (i.e., directed along line 4-4 of FIG. 3) of the vibrating beam 102. The flexure component 304 in one example comprises a vibration isolator. Pickoff and processing components measure and translate the movement of the vibrating beam 102 into a direction and magnitude of the angular rate. FIG. 4 illustrates a sectional representation of the vibrating beam 102 directed along line 4-4 of FIG. 3. FIG. 5 illustrates a sectional representation of the vibrating beam 102 directed along line 5-5 of FIG. 3.

A flexure component 304 allows horizontal and vertical oscillation of the vibrating beam 102 about the nodal point 302. The flexure component 304 comprises a reduced section of the vibrating beam 102 that lies along a center line of a longitudinal axis of the vibrating beam 102. The nodal point 302 in one example is internal to the vibrating beam 102. For example, the vibrating beam 102 comprises one or more apertures 306 that expose an area around the nodal point 302. The aperture 306 in one example passes through the vibrating beam 102. The aperture 306 surrounds the nodal point 302 and the flexure component 304 to provide space for movement of the vibrating beam 102. The aperture 306 is near the nodal point 302. The aperture 306 allows the frame to support the vibrating beam 102 substantially near the nodal point 302. The aperture 306 comprises an open space etched from a surface of the vibrating beam 102 to expose the nodal point 302 and form the flexure component 304.

The flexure component 304 couples the vibrating beam 102 with a mounting component 308. The mounting component 308 couples the vibrating beam 102 with the frame. By coupling the vibrating beam 102 with the frame near the nodal point 302, no translational oscillation energy of the vibrating beam 102 is transferred to support components, such as the mounting component 308 and the frame. Since the nodal point 302 remains substantially steady, connecting the vibrating beam 102 with the mounting component 308 at the nodal point 302 internal to the vibrating beam 102 promotes a reduction in an amount of the oscillation energy of the vibrating beam 102 that is transferred to the support components. For example, connecting the vibrating beam 102 with the frame at a location on the vibrating beam 102 that is in motion during oscillation would transfer oscillation energy from the vibrating beam 102 to the frame resulting in mounting sensitivity. Less energy is required to sustain oscillation in the vibrating beam 102 and higher Q is achieved if the vibrating beam 102 is connected with the frame at the nodal point 302 than if the vibrating beam 102 is connected at the location on the vibrating beam 102 that is in motion during oscillation.

The nodal point 302 comprises a first nodal point of the vibrating beam 102 where the nodal axis 106 (FIG. 1) for vertical oscillation and the nodal axis 204 (FIG. 2) for horizontal oscillation intersect. The vibrating beam 102 comprises a second nodal point (not shown) where the nodal axis 104 (FIG. 1) for vertical oscillation and the nodal axis 202 (FIG. 2) for horizontal oscillation intersect. The second nodal point is connected to a second flexure component (e.g., analogous to the flexure component 304) and a second mounting component (e.g., analogous to the mounting component 308). The flexure component 304 applies a first moment to the mounting component 308. The second flexure component applies a second moment to the second mounting component. The second moment has an opposite polarity to the first moment. So, the second moment cancels the first moment in the frame.

In one example, the vibrating beam 102 is operated in closed loop mode. In another example, the vibrating beam 102 is operated in open loop mode by making the beam asymmetric and separating the vertical and horizontal resonant frequencies.

Figure 6:
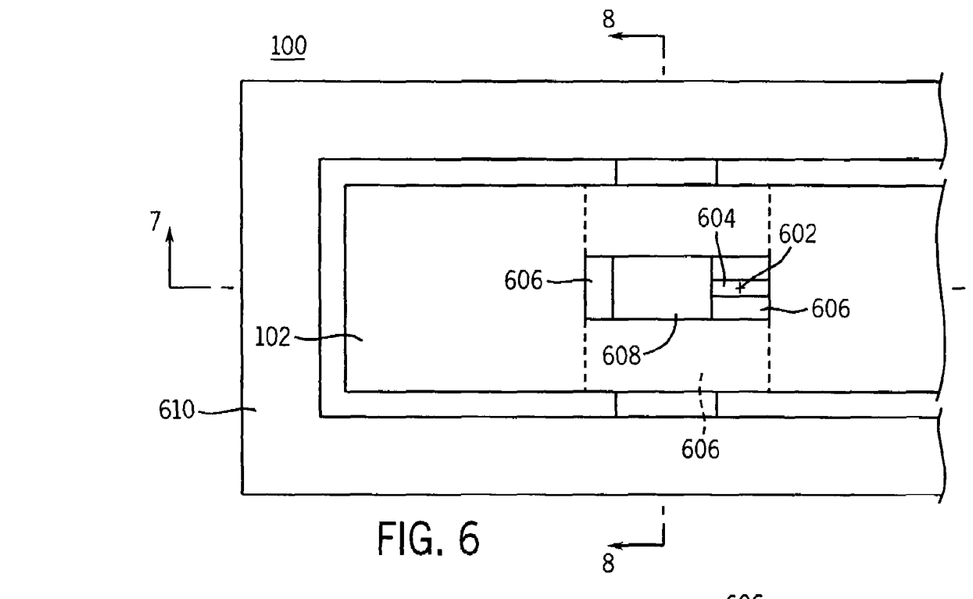
FIG. 6 is another representation of an aperture near a nodal point of the vibrating beam of the apparatus of FIG. 1 where a nodal axis for vertical oscillation and a nodal axis for horizontal oscillation intersect.
Figure 7:
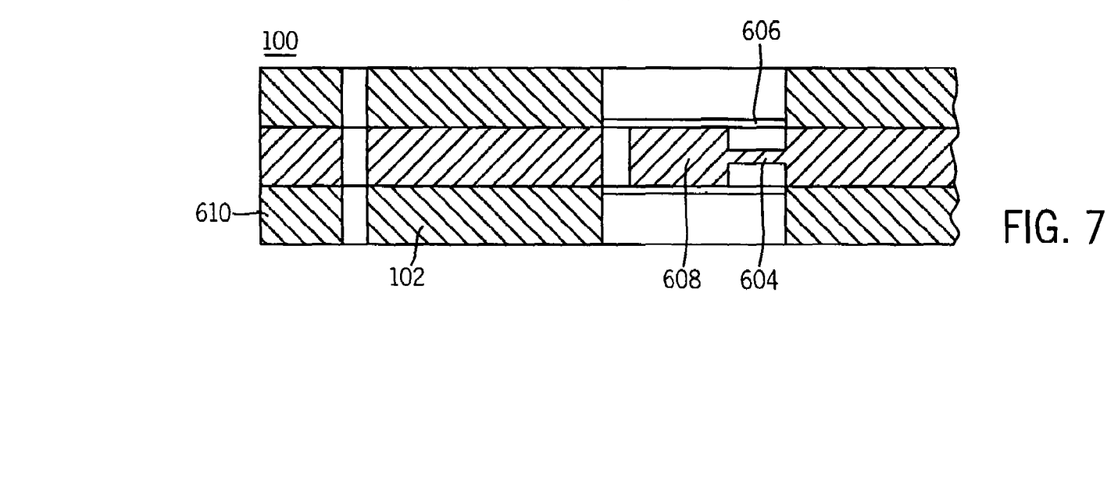
FIG. 7 is a sectional representation of the vibrating beam directed along line 7-7 of FIG. 6.
Figure 8:
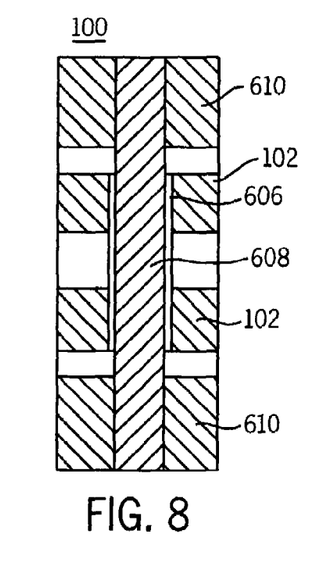
FIG. 8 is a sectional representation of the vibrating beam directed along line 8-8 of FIG. 6.

Referring to FIGS. 6-8, the vibrating beam 102 in one example is symmetric for oscillation in any one or more of a plurality of perpendicular directions. The vibrating beam 102 comprises a nodal point 602 where the nodal axis 106 (FIG. 1) for vertical oscillation and the nodal axis 204 (FIG. 2) for horizontal oscillation intersect. The vibrating beam 102 illustrated in FIGS. 6-8 is analogous to the vibrating beam 102 of FIGS. 3-5. For example, the flexure components 304 and 604, apertures 306 and 606, and mounting components 308 and 608 are analogous. In FIGS. 6-8, the aperture 606 is symmetric for oscillation in either of two perpendicular directions. For example, the aperture 606 is symmetric for oscillation about both the nodal axis 106 (FIG. 1) for vertical oscillation and the nodal axis 204 (FIG. 2) for horizontal oscillation.

The aperture 606 passes through the vibrating beam 102 symmetrically in both vertical and horizontal directions. For example, the aperture 606 passes through the vibrating beam 102 from a top surface of the vibrating beam 102 as well as a side surface of the vibrating beam 102. Therefore, the elastic characteristics are substantially similar in both vertical and horizontal oscillation directions for the vibrating beam 102 of FIGS. 6-8. Since the aperture 606 passes through the top surface and the side surface of the vibrating beam 102, the stiffness of the vibrating beam 102 is similar in both vertical and horizontal oscillation directions. The vibrating beam 102 of FIGS. 6-8 also has the same resonant frequency in both oscillation directions.

The mounting component 608 in one example passes through the aperture 606 to connect with a frame 610 that supports the vibrating beam 102. For example, the aperture 606 that passes through the side surface of the vibrating beam 102 allows the mounting component 608 to extend out of the vibrating beam 102 and connect with the frame 610. FIG. 7 illustrates a sectional representation of the vibrating beam 102 directed along line 7-7 of FIG. 6. FIG. 8 illustrates a sectional representation of the vibrating beam 102 directed along line 8-8 of FIG. 6.

Figure 9:
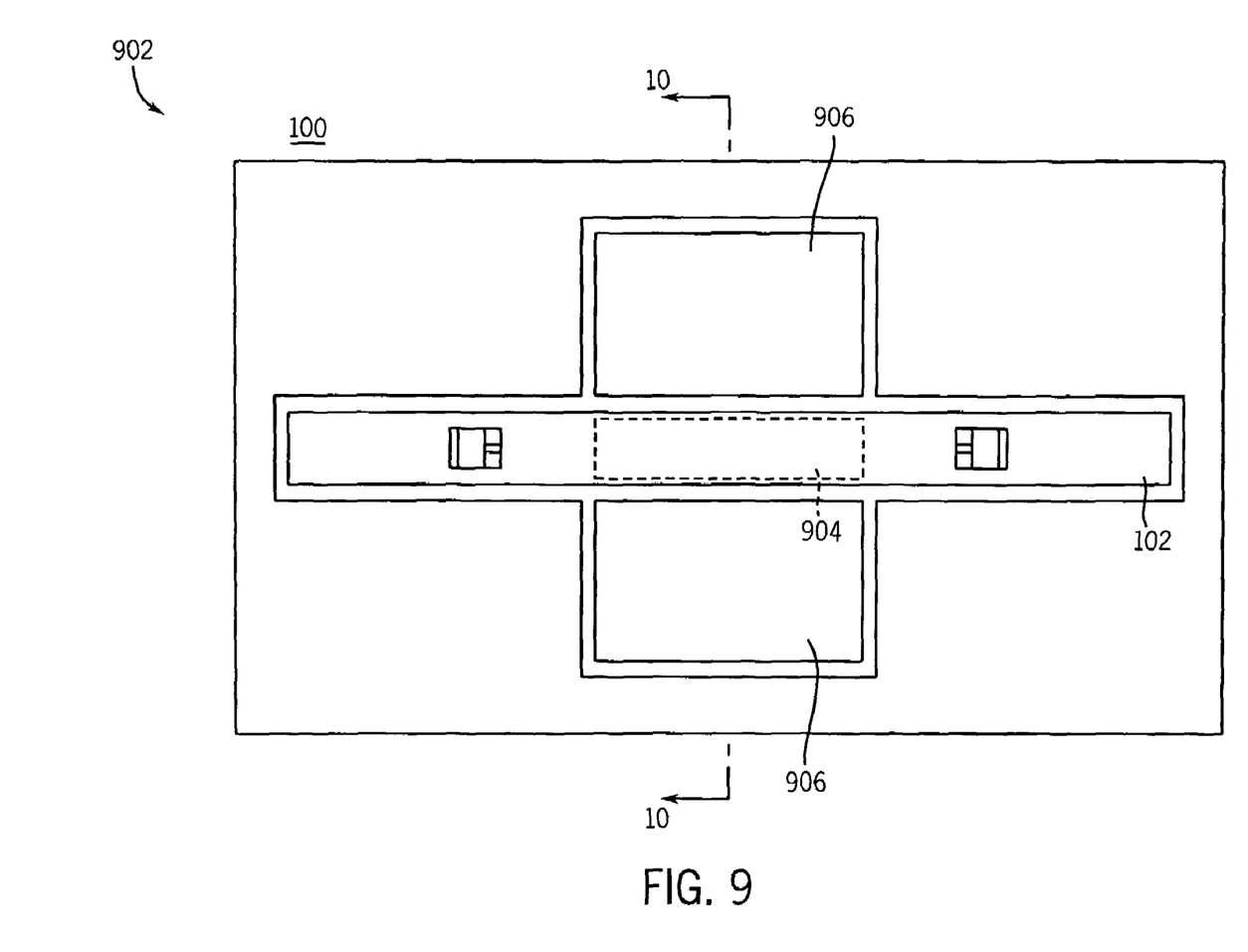
FIG. 9 is a representation of a gyroscope that comprises the vibrating beam of the apparatus of FIG. 1 driven by one or more electrostatic drive components and sensed by one or more capacitive pickoff sensors. The top cover of the gyroscope is removed for clarity.
Figure 10:
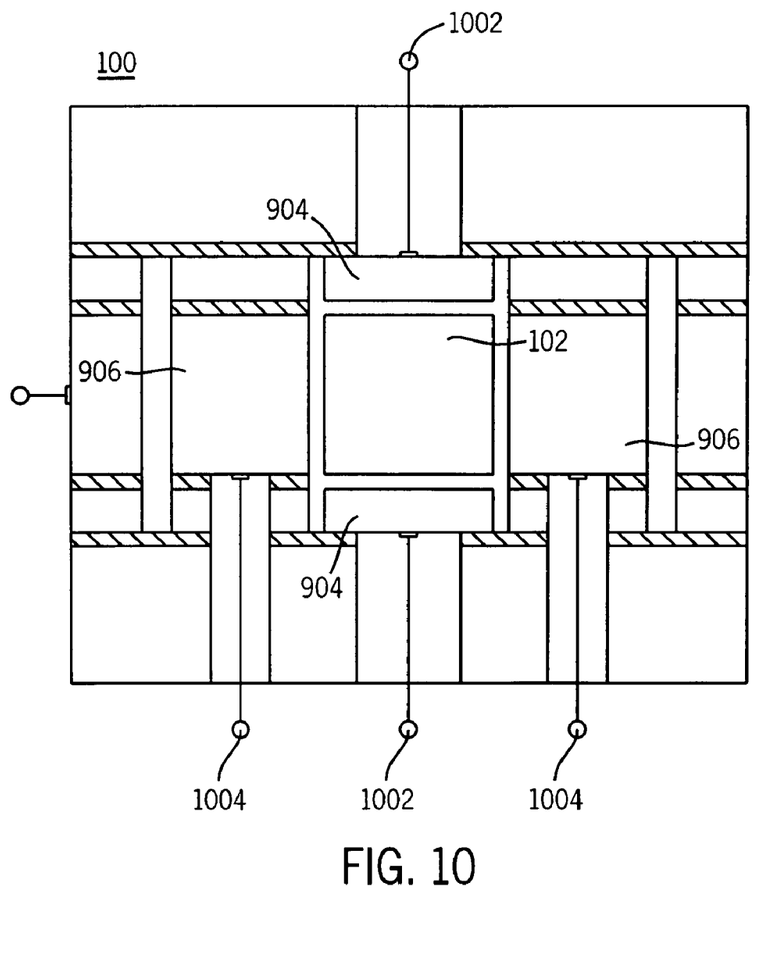
FIG. 10 illustrates a sectional representation of the gyroscope, including the top cover, directed along line 10-10 of FIG. 9.
Figure 11:
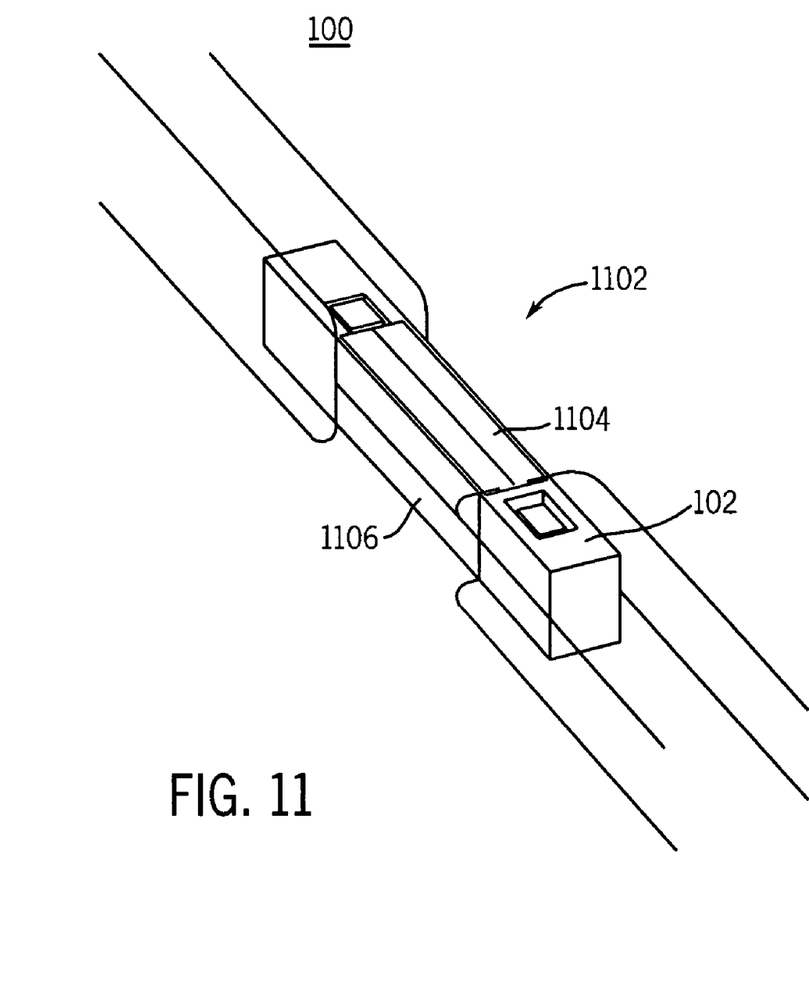
FIG. 11 is a representation of a gyroscope that comprises the vibrating beam of the apparatus of FIG. 1 driven by one or more piezoelectric drive components and sensed by one or more piezoelectric sensors.

Referring to FIGS. 9-11, to initialize a gyroscope that employs the vibrating beam 102, drive components coupled with the vibrating beam 102 cause a first oscillation of the vibrating beam 102. An angular rate of the vibrating beam 102 and the first oscillation induce a Coriolis force on the vibrating beam 102. The Coriolis force causes a second oscillation of the vibrating beam 102. The second oscillation is substantially perpendicular to the first oscillation. Feedback components in one example provide feedback on a magnitude of the first oscillation to the drive components for regulation of the first oscillation. Pickoff components sense the second oscillations to measure a magnitude of the angular rate of the vibrating beam 102.

Referring to FIGS. 9-10, a gyroscope 902 illustrates the vibrating beam 102 driven by one or more electrostatic drive components 904 and sensed by one or more capacitive pickoff sensors 906. FIG. 10 illustrates a sectional representation of the gyroscope 902 directed along line 10-10 of FIG. 9. The gyroscope 902 comprises a plurality of connection components 1002 and 1004 coupled with the drive components 904 and/or sensor components 906. The connection components 1002 in one example comprise electrical paths to the drive components 904. For example, electrical signals travel through the connection components 1002 to control the drive components 904. The connection components 1004 comprise electrical paths to sense Coriolis induced oscillation of the vibrating beam 102 and apply control signals to servo the Coriolis induced oscillation to zero. Referring to FIG. 11, a gyroscope 1102 illustrates the vibrating beam 102 driven by one or more piezoelectric drive components 1104 and sensed by one or more piezoelectric pickoff sensors 1106.

The apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:
1. An apparatus, comprising:
    a vibrating beam that comprises a nodal point for oscillation in any one or more of a plurality of substantially perpendicular directions for driving into oscillation and sensing angular rate of the vibrating beam;

wherein the vibrating beam comprises an aperture that allows a frame to support the vibrating beam near the nodal point;
wherein the aperture exposes a flexure component around the nodal point.

2. The apparatus of claim 1, wherein the nodal point is internal to the vibrating beam, wherein the frame couples with the flexure component to support the vibrating beam.

3. The apparatus of claim 1, wherein the flexure component comprises a vibration isolator.

4. The apparatus of claim 1, wherein the plurality of substantially perpendicular directions comprises a first direction substantially perpendicular with a second direction, wherein the aperture is symmetric for oscillation in either of the first and second directions.

5. The apparatus of claim 1, wherein the vibrating beam comprises a rectangular, triangular, hexagonal, octagonal, or circular prism.

6. The apparatus of claim 1, wherein the nodal point comprises a first nodal point, wherein the aperture comprises a first aperture, wherein the vibrating beam comprises a second aperture around a second nodal point;
wherein the first and second apertures allow the frame to support the vibrating beam near the first and second nodal points.

7. The apparatus of claim 1, wherein the plurality of substantially perpendicular directions comprises a first direction substantially perpendicular with a second direction;
the apparatus further comprising a drive component that causes a drive oscillation in the vibrating beam along the first direction;
wherein the first direction comprises a drive oscillation direction of the vibrating beam, wherein the second direction comprises a Coriolis force induced oscillation direction of the vibrating beam.

8. The apparatus of claim 7, further comprising a pickoff component that senses the oscillation of the vibrating beam in the Coriolis force induced oscillation direction to measure a magnitude of the angular rate of the vibrating beam.

9. The apparatus of claim 8, wherein the pickoff component comprises a pickoff/forcer component that provides a rebalance force to null the oscillation of the vibrating beam in the Coriolis force induced oscillation direction;
wherein the pickoff/forcer component measures a magnitude and polarity of a signal on the pickoff/forcer component to determine the magnitude and polarity of the angular rate about a longitudinal axis of the vibrating beam.

10. The apparatus of claim 7, wherein the nodal point is internal to the vibrating beam;
wherein the flexure component allows oscillation of the vibrating beam about the nodal point in both the drive oscillation direction and the Coriolis force induced oscillation direction.

11. The apparatus of claim 7, wherein the aperture is symmetric in both the drive oscillation direction and the Coriolis force induced oscillation direction to make elastic characteristics of the vibrating beam similar in both the drive oscillation direction and the Coriolis force induced oscillation direction.

12. The apparatus of claim 1, wherein the nodal point is internal to the vibrating beam;
wherein the aperture is adjacent to the flexure component, wherein the aperture provides space for the oscillation of the vibrating beam.

13. The apparatus of claim 1, wherein the aperture is etched out from an outer surface of the vibrating beam to form the flexure component at the nodal point within the vibrating beam.

14. The apparatus of claim 1, wherein the vibrating beam is etched to form a mounting component and the flexure component at the nodal point, wherein the mounting component is positioned at one end of the flexure component;
wherein the frame connects with the mounting component to support the vibrating beam at the nodal point.

15. The apparatus of claim 1, wherein the nodal point is substantially still during die oscillation in the plurality of substantially perpendicular directions;
wherein the frame supports the vibrating beam at the flexure component around the nodal point to promote a reduction in an amount of oscillation energy that transfers from the vibrating beam into the frame.

16. The apparatus of claim 1, wherein the nodal point is internal to to vibrating beam;
wherein the flexure component comprises a reduced cross-section of the vibrating beam that lies along a center line of a longitudinal axis of the vibrating beam.

17. The apparatus of claim 1, wherein the vibrating beam comprises a plurality of nodal points, wherein the plurality of nodal points comprises the nodal point;
wherein the vibrating beam comprises a plurality of apertures that allow the frame to support the vibrating beam near the plurality of nodal points, wherein the plurality of apertures comprises the aperture.

18. The apparatus of claim 1, wherein the aperture passes through the vibrating beam.

19. A gyroscope, comprising:
a vibrating beam;
a drive component that causes a first oscillation in the vibrating beam;
a pickoff component that senses a second oscillation induced in the vibrating beam by a Coriolis force on the vibrating beam;
wherein the vibrating beam comprises a nodal point for both the first and second oscillations, wherein the nodal point is internal to the vibrating beam, wherein the vibrating beam comprises an aperture that exposes a flexure component at the nodal point; and
a frame that connects with the flexure component to support the vibrating beam near the nodal point within the vibrating beam.

20. The apparatus of claim 19, wherein the pickoff component senses the second oscillation to measure a magnitude of an angular rate of the vibrating beam.

21. The apparatus of claim 19, wherein the frame supports the vibrating beam at the flexure component around the nodal point to promote a reduction in an amount of oscillation energy that transfers from the vibrating beam into the frame.

22. The apparatus of claim 19, wherein the first oscillation comprises a drive oscillation in a drive direction, wherein the second oscillation comprises a Coriolis force induced oscillation in a pickoff direction;
wherein the aperture is symmetric in both the drive direction and the pickoff direction to make elastic characteristics of the vibrating beam similar in both the drive direction and the pickoff direction.

23. The apparatus of claim 22, wherein the aperture passes through the vibrating beam symmetrically in both the drive direction and the pickoff direction.

24. The apparatus of claim 19, wherein the drive component comprises a drive/pickoff component that causes the first oscillation in the vibrating beam and measures an amplitude of vibration;

wherein the pickoff component comprises a pickoff/forcer component that senses a second oscillation induced in the vibrating beam by a Coriolis force on the vibrating beam and forces the second oscillation to null.

25. A method, comprising the steps of:

etching an aperture into a vibrating beam of an angular rate sensing gyroscope to form a flexure component at a nodal point within the vibrating beam, wherein the nodal point comprises an intersection location of a first nodal axis of a first oscillation in the vibrating beam and a second nodal axis of a second oscillation in the vibrating beam; and connecting a frame with the flexure component to support the vibrating beam near the nodal point to promote a reduction in an amount of oscillation energy that transfers from the vibrating beam into the frame.

26. The method of claim 25, wherein the step of etching the aperture into the vibrating beam of the angular rate sensing gyroscope to form the flexure component at the nodal point within the vibrating beam comprises the steps of:

locating the nodal point within the vibrating beam;

removing material of the vibrating beam from an area around the nodal point to allow the frame to support the vibrating beam at the nodal point;

wherein the first oscillation comprises a drive oscillation in a drive direction, wherein the second oscillation comprises a Coriolis force induced oscillation in a pickoff direction, wherein the drive direction is substantially perpendicular with the pickoff direction; and forming the aperture to be symmetric in both the drive direction and the pickoff direction to make elastic characteristics of the vibrating beam similar in both the drive direction and the pickoff direction.

27. The apparatus of claim 18, wherein the aperture passes through a top surface of the vibrating beam and a side surface of the vibrating beam.

28. The apparatus of claim 18, wherein the plurality of substantially perpendicular directions comprises a first direction and a second direction that are substantially perpendicular;

wherein the aperture passes through the vibrating beam symmetrically for oscillation in either of the first and second directions.

* * * * *